(No Model.) 2 Sheets—Sheet 1.

F. H. EHLERS.
GRAIN MEASURING AND REGISTERING DEVICE.

No. 386,695. Patented July 24, 1888.

WITNESSES. INVENTOR.
Jno. S. French Jr. F. H. Ehlers.
Chas. D. Davis. By C. W. Alexander,
Attorney.

N. PETERS, Photo-Lithographer, Washington, D. C.

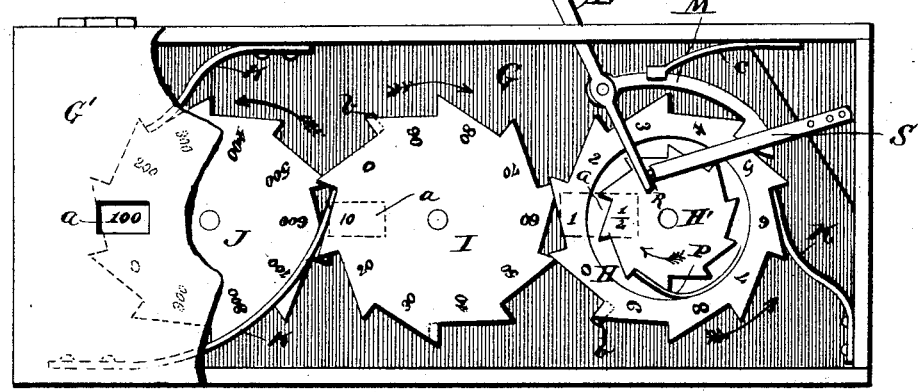
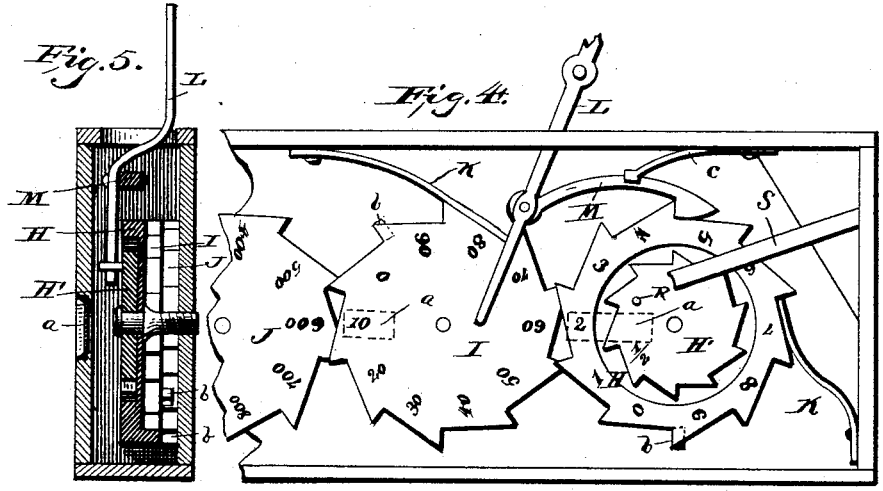
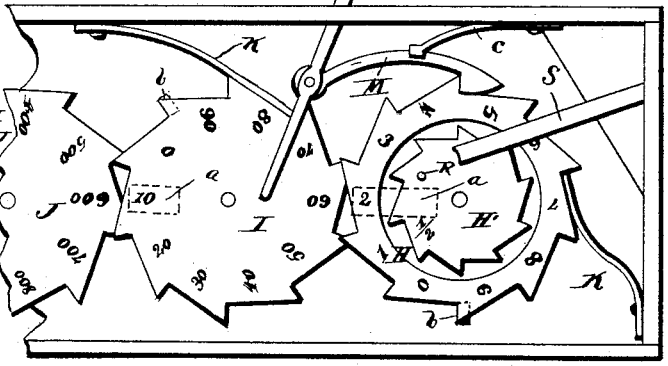

UNITED STATES PATENT OFFICE.

FREDRECH H. EHLERS, OF MONTEVIDEO, MINNESOTA.

GRAIN MEASURING AND REGISTERING DEVICE.

SPECIFICATION forming part of Letters Patent No. 386,695, dated July 24, 1888.

Application filed April 4, 1888. Serial No. 269,530. (No model.)

*To all whom it may concern:*

Be it known that I, FREDRECH H. EHLERS, a citizen of the United States, residing at Montevideo, in the county of Chippewa and State of Minnesota, have invented certain new and useful Improvements in Grain Measuring and Registering Devices, of which the following is a specification, reference being had therein to the accompanying drawings.

My invention has relation to certain new and useful improvements upon grain measures and registers therefor; and it has for its objects, essentially, to provide a simple and positively-operating device whereby the grain may be very rapidly measured off as it comes from the separator or thrasher, and the amount thus measured accurately registered, as will be more fully hereinafter set forth.

The invention consists in certain peculiarities of construction and arrangement of parts, that will be hereinafter fully described, and then particularly pointed out in the claims appended.

Figure 1:
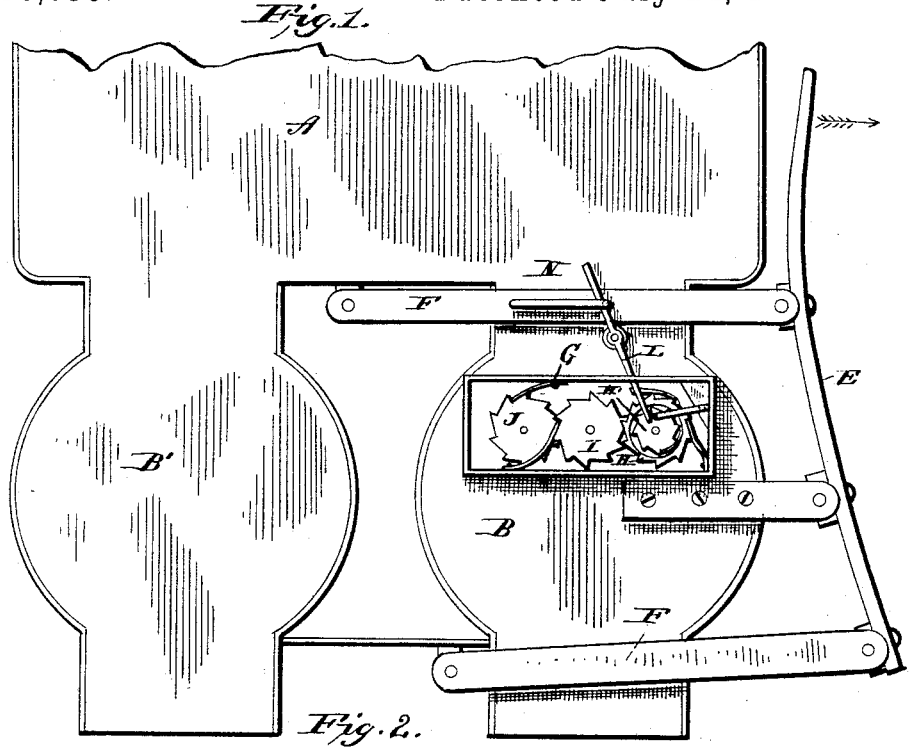
Figure 2:
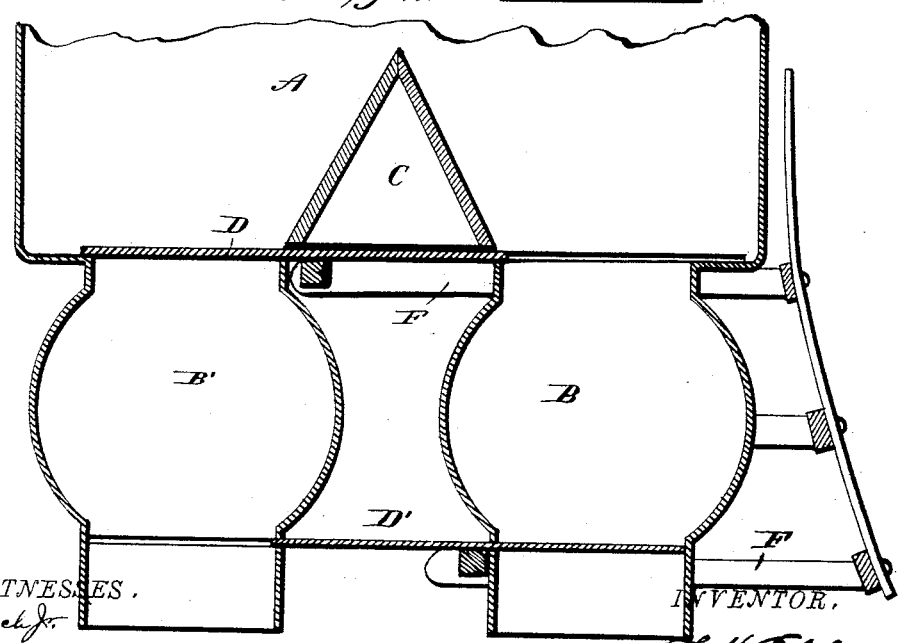

Referring to the annexed drawings, which form a part of this specification, Figure 1 is a side elevation of my invention, the cover or lid of the registering device being removed; Fig. 2, a vertical sectional view of the same; Fig. 3, a detached side elevation of my improved register, a portion of the cover being broken away in order to show the interior of the register; Fig. 4, a similar view of a portion of the register, showing its operating lever and pawl in a different position from that shown in Fig. 3; Fig. 5, a transverse sectional view of the register, taken through the units-wheel; and Fig. 6, a perspective view of one of the registering-wheels.

Referring to the drawings by letter, A designates the hopper of the machine, and B B' two measuring-chambers depending from the bottom of the hopper and communicating with the interior thereof. Inserted in the hopper A between the two measuring-chambers is a transverse pyramidal-shaped deflector, C, which serves to direct the grain into the said measuring-chambers as it falls into the hopper from the thrashers or separators or other source. The lower ends of the measuring-chambers are contracted, in order that bags may be attached thereto to catch and hold the measured grain.

The letters D D' indicate two horizontally-reciprocating slides, the upper one of which, D, works under the deflector C and is adapted to alternately open and close the measuring-chamber openings, as shown. The lower slide, D', is arranged across the contracted lower ends of the measuring-chambers and adapted to alternately open and close the same. Both slides work in suitable guiding-grooves in the walls of the hopper and measuring-chambers, and are operated simultaneously in opposite directions by means of a vibrating hand-lever, E, pivotally supported upon one of the measuring-chambers and pivotally connected to the respective slides through the medium of horizontal links or connecting-rods F. It will be observed that as thus constructed one operation of the vibrating hand-lever will open the lower end of the charged measuring-chamber and close the upper opening of the same, and simultaneously close the lower opening of the empty chamber and uncover its supply-opening. By this means the measuring process will be practically continuous, as it is evident that while one chamber is emptying itself the other chamber is being filled with the grain from the hopper.

I will now describe the registering device, which is of a peculiar construction and particularly adapted for use in connection with this measuring-machine.

G designates the casing of the register, this casing being provided with a suitable hinged cover, G', having suitable peep holes or openings, *a*, through it. The registering device, which is located in this casing, consists, essentially, of three toothed or notched indicating-wheels, (lettered, respectively, H I J,) the first wheel, H, being the units-wheel, the middle wheel, I, being the tens-wheel, and the other, J, being the hundreds-wheel, as clearly shown. The wheels H and I are each provided with a lug or pin, *b*, on its under side, which is adapted to engage with the teeth of one of the adjacent wheels. By this arrangement, when the units-wheel H is given one revolution, the tens-wheel will be rotated the distance of one notch, thus requiring ten revolutions of the units-wheel to rotate the tens-wheel once. At every revolution of the tens-wheel the hundreds-wheel will be rotated the distance of one notch, and so on. The wheels are each provided with ten notches and ten figures, the figures being stamped or printed on their faces and so arranged with respect to the openings *a* in the cover that they will appear successively before the openings as the wheels are rotated, so as to be easily seen by the attendant. It is evident that the amount registered will be equal to the sum of all the figures appearing before the openings. Each wheel is provided with a leaf-spring, K, which is adapted to prevent the wheel from being rotated in the wrong direction.

The units-wheel is rotated on its axis by means of a vibrating lever, L, and a pawl, M. The vibrating lever L is pivoted to the side of the measuring-chamber and has its upper portion projecting through a loop, N, on one of the links F, as shown in Fig. 1. By this means it is obvious that whenever the hand-lever E is vibrated the vibrating lever L will also be vibrated upon its pivot. The lower portion or arm of this lever L projects through a slot in the upper side of the casing G and has pivoted to it a short distance from its end the pawl M, which is held normally upon the notched periphery of the units-wheel H by means of a spring, *c*.

It will thus be perceived that every time the hand-lever E is moved away from the hopper in the direction indicated by the arrow on Fig. 1 the units-wheel (through the medium of the lever L and its pawl M) will be rotated the distance of one notch, and that on the reverse movement of the lever the said wheel will remain still, being held by the spring K. This wheel H it will therefore be seen is only rotated one notch every time both measuring-chambers are emptied, and that that rotation takes place when the hand-lever is moved away from the hopper and the chamber B emptied. Now it becomes necessary, in order that the measuring will be accurate, to provide means for registering and indicating the contents of the single chamber B' previous to its being registered upon the wheel H when the chamber B is emptied. Thus, as in the present machine, if the measuring-chambers have each a capacity of one-half bushel, it is only necessary to register and indicate the first half-bushel, B', of each bushel before it is registered upon the wheel H along with the other half-bushel, B, the wheel H only registering the whole bushel. To accomplish this, I loosely journal on the axis of the units-wheel H a smaller supplemental notched wheel, H', held against rotation in one direction by means of a leaf-spring, P, secured to and rotating with the wheel H, the wheel H' being in this instance set in a recess in the face of the wheel H for compactness. This supplemental wheel H' has stamped or secured on its face a figure or fraction to indicate the amount of grain each measuring-chamber is capable of holding, in this instance the fraction ½ being used. This fraction is placed in such a position on the supplemental wheel H' that it appears before the same opening, *a*, in the cover G' that the figures on the units-wheels H do, as clearly shown in Fig. 3, where the opening in the cover is shown in dotted lines. The wheel H' only partially rotates upon its axis, the wheel H being revolved around it by means of the pawl M, as described.

The letter R designates a pin projecting from the face of the wheel H', and S a suitable stop secured to the casing G, this stop serving to limit the travel of the said pin R when the lower end of the lever L strikes against it, as will be presently described.

It will be perceived that when the hand-lever E is moved toward the hopper to discharge the contents of the chamber B' the parts will assume the position shown in Figs. 1, 2, and 3, the lower end of the lever L striking against the pin R and forcing it against the stop S, the wheel H' being thereby rotated partially on its axis, so as to bring the fraction on its face directly before the opening *a* in the cover, thus registering the half-bushel discharged from the said chamber B', as is evident. Now, when the lever E is moved away from the hopper so as to discharge the other half-bushel contained in chamber B, the wheel H will be rotated a sufficient distance by the pawl M to bring the next figure on its face into view, and thus register the whole bushel, (the contents of both chambers,) the wheel H' turning with the wheel H through the medium of the spring P, so as to carry the fraction ½ down out of view, and so on through every successive operation. By this means it is evident the exact amount measured can be always ascertained by a glance at the register. The register in Fig. 3 shows that one hundred and eleven and one-half bushels have been measured off, and in Fig. 4 that one hundred and twelve bushels have been measured, as clearly shown.

Having thus fully described my invention, what I claim as new, and desire to secure by Letters Patent, is—

1. In a grain-measurer, the combination of the hopper, the two depending measuring-chambers communicating with the said hopper, the deflector C, inserted in the hopper between the two measuring-chamber openings, the reciprocating slides D D', for opening and closing the inlet and exit openings of the said measuring-chambers, the vibrating hand-lever, and the links connecting this hand-lever to the reciprocating slides D D', whereby these slides are operated with one movement of the lever simultaneously in opposite directions to alternately open and close the inlet and exit openings of the said measuring-chambers, substantially as described.

2. In a grain measurer and register, the combination, with the hopper and depending measuring-chambers, the slides for opening and closing the inlet and exit openings of these chambers, the vibrating hand-lever, and the links F, connecting the hand-lever to the said slides, of the pivoted vibrating lever L, engaging with one of the links F, the toothed registering-wheels engaging with each other, the springs for retaining these registering-wheels, the spring-actuated pawl M, for actuating the registering-wheels pivoted to the lever L near its lower end, the supplemental toothed wheel H', provided with a pin, R, projecting from its face, the stop S, for limiting the travel of this pin R, this pin being adapted to be struck by the lower end of the lever L in its movements, and the spring P, secured to the first registering-wheel and adapted to engage the notched periphery of the said supplemental wheel H', all arranged as and for the purpose herein set forth.

In testimony whereof I affix my signature in presence of two witnesses.

FREDRECH H. EHLERS.

Witnesses:
ELIAS JACOBSON,
A. I. AMUNDSON.